United States Patent
Israelsson et al.

(10) Patent No.: US 12,258,168 B2
(45) Date of Patent: Mar. 25, 2025

(54) INDUCTOR FOR TRANSVERSAL SEALING, A PACKAGING MACHINE COMPRISING THE INDUCTOR FOR TRANSVERSAL SEALING AND A METHOD THEREOF

(71) Applicant: TETRA LAVAL HOLDINGS & FINANCE S.A., Pully (CH)

(72) Inventors: Karl Israelsson, Malmö (SE); Per Karlsson, Limhamn (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 18/000,528

(22) PCT Filed: Jun. 16, 2021

(86) PCT No.: PCT/EP2021/066262
§ 371 (c)(1),
(2) Date: Dec. 2, 2022

(87) PCT Pub. No.: WO2022/008187
PCT Pub. Date: Jan. 13, 2022

(65) Prior Publication Data
US 2023/0227194 A1 Jul. 20, 2023

(30) Foreign Application Priority Data
Jul. 8, 2020 (EP) ..................... 20184651

(51) Int. Cl.
*B65B 51/22* (2006.01)
*B29C 65/00* (2006.01)
(Continued)

(52) U.S. Cl.
CPC .......... *B65B 51/30* (2013.01); *B29C 66/8491* (2013.01); *B65B 9/12* (2013.01);
(Continued)

(58) Field of Classification Search
CPC ....... B65B 9/12; B65B 9/2049; B65B 51/144; B65B 51/227; B65B 51/30; B65B 51/306;
(Continued)

(56) References Cited

U.S. PATENT DOCUMENTS

| 6,044,628 A | * | 4/2000 | Katayama et al. ... B65B 51/303 53/552 |
| 2002/0108705 A1 | * | 8/2002 | Kume et al. ........ B29C 66/8491 156/515 |

(Continued)

FOREIGN PATENT DOCUMENTS

| EP | 0730946 A2 | 9/1996 | |
| EP | 3260383 A1 * | 12/2017 | ............... B65B 9/20 |

(Continued)

OTHER PUBLICATIONS

International Search Report (PCT/ISA/210) and Written Opinion (PCT/ISA/237) mailed on Aug. 20, 2021, by the European Patent Office as the International Searching Authority for International Application No. PCT/EP2021/066262. (10 pages).

*Primary Examiner* — Stephen F. Gerrity
(74) *Attorney, Agent, or Firm* — BUCHANAN INGERSOLL & ROONEY PC

(57) ABSTRACT

An inductor for transverse sealing a packaging material tube filled with food product comprises a main body comprising first and second sealing surfaces facing the packaging material during a sealing state, a recess in the main body for receiving a knife during a cutting state, and an electric conductor arrangement, in the main body for inducing eddy currents in the packaging material during the sealing state. The first/second sealing surfaces each comprise a top section, an inner sealing section between the recess and the top section, and an outer sealing section between the top section and an outer edge of the inductor. The inner sealing section is inclined towards the recess, and the outer sealing section (Continued)

is inclined towards the outer edge, so that product in the tube is pushed away from a sealing band of the tube as the first/second sealing surfaces are pressed towards the sealing band.

16 Claims, 8 Drawing Sheets

(51) Int. Cl.
*B65B 9/12* (2006.01)
*B65B 9/20* (2012.01)
*B65B 51/30* (2006.01)
*B65B 61/06* (2006.01)

(52) U.S. Cl.
CPC .......... *B65B 9/2049* (2013.01); *B65B 51/227* (2013.01); *B65B 61/06* (2013.01)

(58) Field of Classification Search
CPC ......... B65B 61/06; B65B 61/24; B29C 65/36; B29C 65/745; B29C 66/4312; B29C 66/81431; B29C 66/83543; B29C 66/8491
USPC ........................................ 53/451, 552, 374.2
See application file for complete search history.

(56) References Cited

U.S. PATENT DOCUMENTS

| | | | |
|---|---|---|---|
| 2005/0028496 A1* | 2/2005 | Sabbadini et al. ...... | B65B 51/30 53/548 |
| 2013/0133291 A1* | 5/2013 | Fontanazzi et al. .. | B65B 9/2049 53/551 |
| 2015/0135649 A1* | 5/2015 | Orsini et al. .......... | B65B 51/303 53/551 |
| 2016/0001498 A1* | 1/2016 | Voegler et al. ... | B29C 66/81431 53/551 |
| 2018/0057198 A1* | 3/2018 | Anderson et al. .. | B29C 66/8491 |
| 2018/0222617 A1* | 8/2018 | Yamamoto et al. ......................... | B29C 66/8491 |
| 2021/0101348 A1* | 4/2021 | Tucker .................. | B65B 51/303 |

FOREIGN PATENT DOCUMENTS

| | | | | |
|---|---|---|---|---|
| EP | 3693154 | A1 | 8/2020 | |
| JP | S63-67208 | A | 3/1988 | |
| JP | 2825880 | B2 * | 11/1998 | |
| JP | 2006-123974 | A | 5/2006 | |
| JP | 2009149365 | A * | 7/2009 | ......... B29C 66/4312 |
| JP | 2016169020 | A * | 9/2016 | ......... B29C 66/4312 |
| WO | 2014166765 | A1 | 10/2014 | |

* cited by examiner

INDUCTOR FOR TRANSVERSAL SEALING, A PACKAGING MACHINE COMPRISING THE INDUCTOR FOR TRANSVERSAL SEALING AND A METHOD THEREOF

TECHNICAL FIELD

The invention is related to packaging technology. More particularly, it is related to an inductor for transversal sealing of a tube of packaging material filled with food product. It is further related to packaging machine for producing food packages and a method thereof.

BACKGROUND ART

Today it is well known to produce carton packages filled with liquid food products, e.g. Tetra Brik™ packages filled with milk. The Tetra Brik™ packaging machine is an example of a roll-fed packaging machine, sometimes also referred to as a roll-fed filling machine. In the roll-fed packaging machine a web of packaging material, provided to the packaging machine on a reel, is formed into a tube and a longitudinal sealing is provided. After having formed the tube and provided the longitudinal sealing, the tube is filled with product. From a lower end of the tube, transversal sealings are continuously made. In connection with making the transversal sealings, the lower end of the tube is cut off such that packages filled with liquid product are formed. These packages are thereafter transferred to a folding device that folds the packages into their final form by making use of pre-made folding lines, sometimes also referred to as weakening lines, provided in the packaging material.

Another type of packaging machine is so-called blanks-fed packaging machines. Unlike the roll-fed packaging machine, the packages are made one by one in the blanks-fed packaging machine. Another difference among the two is that the longitudinal sealing is not made in the packaging machine but is pre-made. A blank is thus in this context to be seen as a sleeve-shaped piece of packaging material. In the blanks-fed packaging machine, the blank is erected, i.e. unfolded such that an inner space is formed. After being erected a closed end is formed by providing a transversal sealing in one end of the sleeve. In a next step product is filled into the sleeve and thereafter another end of the sleeve is closed by providing a transversal sealing such that a closed package is formed.

To make sure that the product is kept safely within the package, the transversal sealings should be made in a reliable manner. Technology for providing reliable transversal sealings has been used for many years, but since the requirements in terms of speed, e.g. number of packages produced per hour, different types of products to be filled into the packages, e.g. high-viscous products and products containing seed and other types of particles, service intervals etc. are continuously increasing, there is a need for improved transversal sealing technology.

SUMMARY

It is an object of the invention to at least partly overcome one or more of the above-identified limitations of the prior art.

According to a first aspect, an inductor for transversal sealing of a tube of packaging material filled with food product is provided. The inductor comprising:

a main body comprising a first and a second sealing surface arranged to face the packaging material during a sealing state;

a recess provided in the main body for receiving a knife during a cutting state, wherein the first and second sealing surface are placed on opposite sides of the recess; and an electric conductor arrangement, provided in the main body, for inducing eddy currents in the packaging material during the sealing state;

characterized in that each of the first and second sealing surface comprises a top section, an inner sealing section placed between the recess and the top section, and an outer sealing section placed between the top section and an outer edge of the inductor, and wherein the inner sealing section is inclined towards the recess, and the outer sealing section is inclined towards the outer edge, thereby providing for that product in the food product held inside the tube is pushed away from a sealing band of the tube as the first and second sealing surfaces are pressed towards the sealing band.

By the term "transversal sealing" is here meant a sealing of a top or a bottom of the tube of packaging material.

By the term "inclined" is here meant tilted with an angle. Thus, it should be interpreted as height in relation to length, or put it in other words, height divided by length.

By the term "sealing band" is here meant a section of the tube that may be to be formed into the transversal sealing.

An advantage with using the disclosed inductor for transversal sealing of the tube is that a desired pressure profile may be achieved. By having the desired pressure profile, it may be possible to squeeze out the product from the sealing zone such that no, or at least a reduced amount of, product may be encapsulated in the sealing zone. Thus, the disclosed inductor may provide for a more reliable sealing zone wherein no product may leave the package and no air may enter the package. In particular, food products comprising particles, such as seeds, may significantly affect the transversal sealing if being encapsulated.

A further advantage with the design of the disclosed inductor may be that the pressure towards the inductor may be reduced as an effect of the the phase placed outside the outer sealing section, which may provide for a gentler treatment of the packaging material, which in turn may result in that thinner packaging material may be used or that less cracks or other damages to the packaging material can be avoided.

Still an advantage of having the first and second sealing surfaces inclined is that a pressure gradient can successively be built up inside the tube. Since different products may differ in terms of e.g. viscosity and in that they comprise particles or not, and if comprising particles that these may have different properties, different products may require different measures for avoiding product residues in the sealing band. By customizing an inclination profile, that is how the sealing surfaces are inclined, based on the product held inside the tube, the pressure gradient build-up can be optimized for the product, implying an even further improved transversal sealing.

In addition to improving that product residues are adequately removed from the sealing band in the sealing stage S, having the sealing surfaces inclined also has a positive effect on sealing quality. A pressure gradient is namely also formed in the polymer layer that is melted during the sealing stage S. This provides for that how melted polymer in the packaging material is moved can be controlled in a more precise manner compared to if using the flat-surfaced inductors. In turn, this may result in that a risk of having aggregations of melted polymer in the packaging material can be reduced. Put differently, the melted polymer can be distributed more efficiently. Another positive effect is that less polymer may be required for making reliable transversal sealing. Since how the melted polymer is distributed during the sealing stage S can be controlled in a more precise manner, this may imply that less polymer is required, which is advantageous from an environmental point of view as well as from a cost perspective.

An outer sealing section length (OSS-L) may be larger than an inner sealing section length (ISS-L).

By the term "outer sealing surface" is here meant the length of the outer sealing surface located between the top section and an outer section of the inductor.

By the term "inner sealing surface" is here meant the length of the inner sealing surface located between the recess and the top section.

The inductor may comprise an inner sub-section inclination of an inner sub-section of the outer sealing surface that may be greater than an outer sub-section inclination of an outer sub-section of the outer sealing surface, wherein the inner sub-section may abut the top section.

The inner sealing surface may have a constant inclination.

A sealing band length may be less than 14 mm. An advantage of having sealing band length less than 14 mm is that less packaging material is needed for the transversal sealing, which in turn provides for increased cost efficiency. Thus, by designing the inductor such that less food product is present in the sealing zone an improved total cost of ownership can be achieved.

The electric conductor arrangement may comprise a twin-loop.

By the term "twin loop" is here meant that the electronic conductor may comprise a first coil and a second coil, that is, one coil is provided on either side of a recess configured to receive the knife during the cutting stage. The twin loop may comprise one and the same circuit forming the first and second coil.

According to a second aspect it is provided a packaging machine for producing food packages. The packaging machine comprising
- a roll receiver arranged to receive a roll of packaging material,
- a tube former arranged to form a tube from the packaging material,
- a product filling device arranged to fill the tube with food product,
- a transversal sealing arrangement arranged to provide transversal sealings in a lower portion of the tube, said transversal sealing arrangement comprising a first and a second sealing jaw element, wherein the first sealing jaw element is attached to a first arm and the second sealing jaw element is attached to a second arm, wherein the first arm is attached to a first motor arrangement and the second arm is attached to a second motor arrangement,
- wherein the first sealing jaw element comprises an inductor according to any one of the preceding claims,
- wherein the second sealing jaw element comprises an anvil,
- wherein the first and second motor arrangement are configured to move the transversal sealing arrangement between
  - an upper, open state in which the first and second arms are in an upper position and the first and second sealing jaw elements are separated,
  - an upper, sealing state in which the first and second arms are in the upper position and the first and second sealing jaw elements are pressed onto the tube from opposite sides,
  - a lower, sealing state in which the first and second arms are in a lower position and the first and second sealing jaw elements are pressed onto the tube from the opposite sides, and
  - a lower, open state in which the first and second arms are in the lower position and the first and second sealing jaw elements are separated,
- wherein the upper and lower inclined surface of the inductor provides for that the food product is moved away from a sealing section of the packaging material during an upper state transition from the upper, open state to the upper, sealing state.

The packaging machine may be configured to produce food packages that may comprise less than 200 ml food product each.

The packaging machine may run with a speed of less than 20,000 food packages per hour.

According to a third aspect it is provided a method for producing food packages filled with food product. The method comprising:
- receiving a roll of packaging material by using a roll receiver,
- forming a tube from the packaging material by using a tube former,
- filling the food product into the tube using a product filling device,
- sealing the tube transversally in a lower portion of the tube by using a transversal sealing arrangement comprising a first and a second sealing jaw element, wherein the first sealing jaw element is attached to a first arm and the second sealing jaw element is attached to a second arm, wherein the first arm is attached to a first motor arrangement and the second arm is attached to a second motor arrangement, wherein the first sealing jaw element comprises an inductor for heating the packaging material,
- wherein the inductor comprises
  - a main body comprising a first and a second sealing surface arranged to face the packaging material during a sealing state,
  - a recess provided in the main body for receiving a knife during a cutting state, wherein the first and second sealing surface are placed on opposite sides of the recess, and
  - an electric conductor arrangement, provided in the main body, for inducing eddy currents in the packaging material during the sealing state,
- wherein each of the first and second sealing surface comprises a top section, an inner sealing section placed between the recess and the top section, and an outer sealing section placed between the top section and an outer edge of the inductor,
- wherein the inner sealing section is inclined towards the recess, and the outer sealing section is inclined towards the outer edge,
- wherein the second sealing jaw element comprises an anvil,
- wherein the step of sealing comprises the sub-steps of
- placing the transversal sealing arrangement in an upper, open state in which the first and second arms are in an upper position and the first and second sealing jaw elements are separated by using the first and second motor arrangement, placing the transversal sealing arrangement in an upper, sealing state in which the first and second arms are in the upper position and the first and second sealing jaw elements are pressed onto the tube from opposite sides by using the first and second motor arrangement, thereby providing for that particles in the food product held inside the tube are pushed away from a sealing band of the tube as the first and second sealing surfaces are pressed towards the sealing band placing the transversal sealing arrangement in a lower, sealing state in which the first and second arms are in a lower position and the first and second sealing jaw elements are pressed onto the tube from the opposite sides by using the first and second motor arrangement, and placing the transversal sealing arrangement in a lower, open state in which the first and second arms are in the lower position and the first and second sealing jaw elements are separated by using the first and second motor arrangement.

The inductor disclosed in the second aspect may comprise an outer sealing section length (OSS-L) that may be larger than an inner sealing section length (ISS-L).

The inductor disclosed in the second aspect may comprise an inner section inclination of an inner section of the outer sealing surface that may be greater than an outer section inclination of an outer section of the outer sealing surface, wherein the inner section may abut the top section.

The inner sealing surface may have a constant inclination.

A sealing band length may be less than 14 mm.

According to a fourth aspect it is provided a food package. The food package is obtainable by the steps of:

receiving a roll of packaging material by using a roll receiver, forming a tube from the packaging material by using a tube former, filling the food product into the tube using a product filling device, sealing the tube transversally in a lower portion of the tube by using a transversal sealing arrangement comprising a first and a second sealing jaw element, wherein the first sealing jaw element is attached to a first arm and the second sealing jaw element is attached to a second arm, wherein the first arm is attached to a first motor arrangement and the second arm is attached to a second motor arrangement, wherein the first sealing jaw element comprises an inductor for heating the packaging material, wherein the inductor comprises a main body comprising a first and a second sealing surface arranged to face the packaging material during a sealing state, a recess provided in the main body for receiving a knife during a cutting state, wherein the first and second sealing surface are placed on opposite sides of the recess, and an electric conductor arrangement, provided in the main body, for inducing eddy currents in the packaging material during the sealing state, wherein each of the first and second sealing surface comprises a top section, an inner sealing section placed between the recess and the top section, and an outer sealing section placed between the top section and an outer edge of the inductor, wherein the inner sealing section is inclined towards the recess, and the outer sealing section is inclined towards the outer edge, wherein the second sealing jaw element comprises an anvil, wherein the step of sealing comprises the sub-steps of placing the transversal sealing arrangement in an upper, open state in which the first and second arms are in an upper position and the first and second sealing jaw elements are separated by using the first and second motor arrangement, placing the transversal sealing arrangement in an upper, sealing state in which the first and second arms are in the upper position and the first and second sealing jaw elements are pressed onto the tube from opposite sides by using the first and second motor arrangement, thereby providing for that particles in the food product held inside the tube are pushed away from a sealing band of the tube as the first and second sealing surfaces are pressed towards the sealing band placing the transversal sealing arrangement in a lower, sealing state in which the first and second arms are in a lower position and the first and second sealing jaw elements are pressed onto the tube from the opposite sides by using the first and second motor arrangement, and placing the transversal sealing arrangement in a lower, open state in which the first and second arms are in the lower position and the first and second sealing jaw elements are separated by using the first and second motor arrangement.

The food package may comprise a transversal sealing fin height of 7 mm or less. Having a sealing band length of less than 14 mm provides for that the sealing fin length of the package produced can be less than 7 mm.

Still other objectives, features, aspects and advantages of the invention will appear from the following detailed description as well as from the drawings.

Effects and features of the second, third and fourth aspects are largely analogous to those described above in connection with the first aspect. Embodiments mentioned in relation to the first aspect are largely compatible with the second, third and fourth aspect. It is further noted that the inventive concepts relate to all possible combinations of features unless explicitly stated otherwise. A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

Embodiments of the invention will now be described, by way of example, with reference to the accompanying schematic drawings, in which.

DETAILED DESCRIPTION

Figure 1:
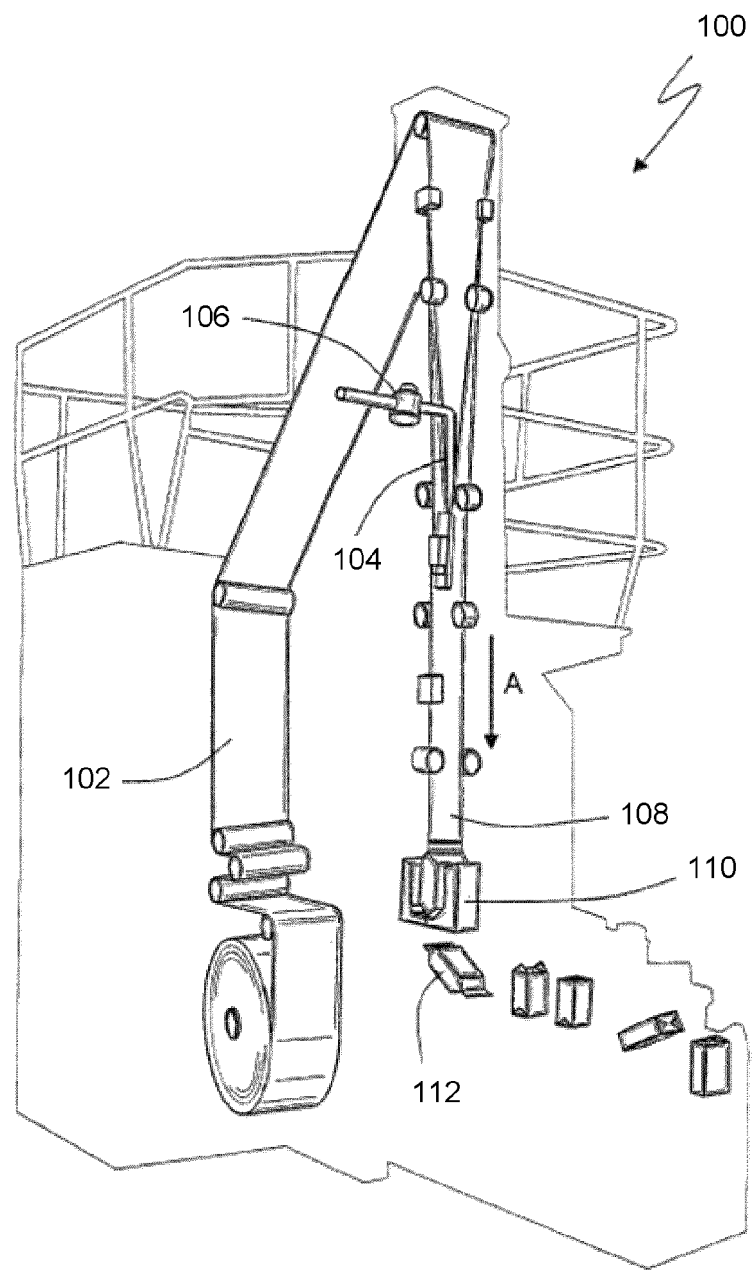
FIG. 1 is a general illustration of a roll-fed packaging machine.

FIG. 1 generally illustrates a packaging machine 100. In the illustrated example, the packaging machine 100 is a roll-fed carton packaging machine. The general principle of such a machine is that from a roll of packaging material a web 102 is formed. The packaging machine 100 may comprise a roll receiver (not illustrated in the figure) for receiving the roll of packaging material. Although not illustrated, if needed in order to fulfill food safety regulations, the web 102 may be sterilized using a hydrogen peroxide bath, a Low Voltage Electron Beam (LVEB) device or any other apparatus capable of reducing a number of unwanted microorganisms. After sterilization, by using a tube former, the web 102 can be formed into a tube 104. According to one non-limiting example, the tube former may be a longitudinal sealing device. When having formed the tube a product, for instance milk, can be fed into the tube 104 from a product filling device via a product pipe 106 placed at least partly inside the tube 104.

In order to form a package 112 from the tube 104 filled with product, a transversal sealing can be made in a lower end of the tube by using a sealing apparatus 110. Generally, the sealing apparatus 110 has two main functions—providing the transversal sealing, i.e. welding two opposite sides of the tube 104 together such that the product in a lower part of the tube 104, placed downward the sealing apparatus 110, is separated from the product in the tube 104 placed upward the sealing apparatus 110, and cutting off the lower part of the tube 104 such that the package 112 is formed. Alternatively, instead of providing the transversal sealing and cutting off the lower part in one and the same apparatus as illustrated, the step of cutting off the lower part may be made in a subsequent step by a different piece of equipment, or by the consumer if the packages are intended to be sold in a multi-pack. The sealing apparatus 110 will be further discussed in connection with FIGS. 2 and 3A-D.

Figure 2:
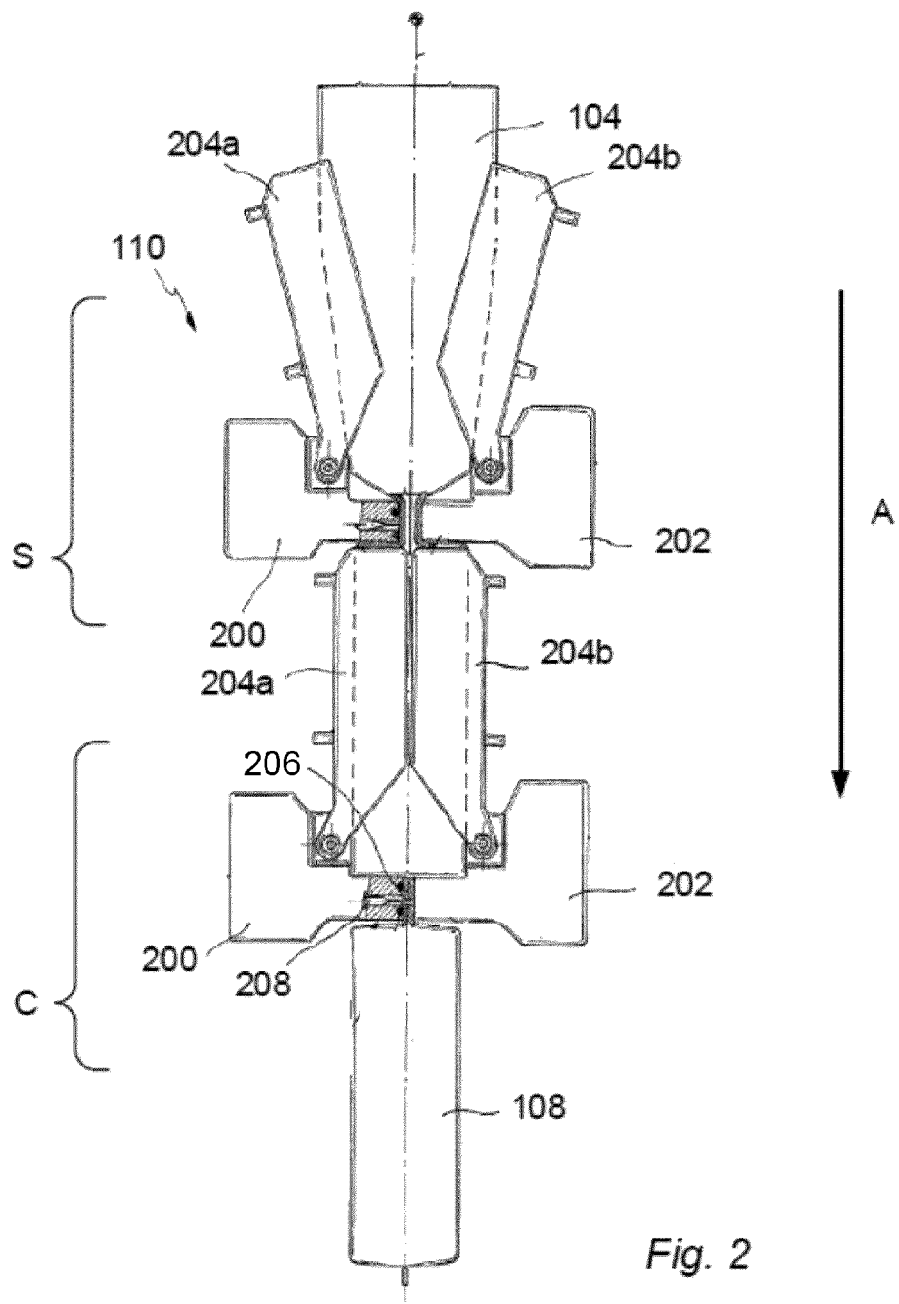
FIG. 2 is a more detailed view of a sealing apparatus arranged in the packaging machine and used for providing transversal sealings.

With reference to FIG. 2, a general principle of the sealing apparatus 110 is illustrated in further detail. The tube 104 can be fed from above since this provides for that product can be held inside the tube 104. The sealing apparatus 110 may be configured to be in a first stage, a sealing stage S. In the sealing state S, a first sealing element 200 and a second sealing element 202 are moved towards each other such that two opposite sides of the tube 104 are pressed towards one another. The sealing state S will be discussed in more detail in connection with FIG. 3A-D.

The sealing apparatus 110 may be configured to be in a subsequent step, herein referred to as a cutting stage C. In the cutting stage C, the lower part of the tube 104 can be cut off such that the package 112 is formed. In order to increase a speed in which packages are formed, the sealing elements 200, 202, also referred to as sealing jaw elements herein, can be moved together with the tube 104 in a tube feeding direction A during the sealing stage S and the cutting stage C.

In order to provide for a more controlled forming process of the package 112 so-called volume forming flaps 204a, 204b can be used. More specifically, by using these the tube 104 having a round cross-section may be steered into a package 112 having a rectangular cross-section in a controlled manner.

The first sealing element 200 can be provided with an inductor 206, which will be discussed in further detail in connection with FIGS. 4A-C and 5A-C. After having provided the transversal sealing a knife 208 can be used for cutting off the lower part of the tube 104 and thus form the package 112. In this example, the knife 208 and the inductor 206 are provided in the first sealing element 200, but other arrangements are also possible. For instance, the knife 208 may be provided on the other side of the tube 104, in the second sealing element 202, or the cutting step may be performed by a separate device downstream the sealing device.

With reference to FIG. 3A-D, sub-states of the sealing state S are illustrated by way of example. In addition, a transversal sealing arrangement 300 that may be part of the sealing apparatus 110 is illustrated by way of example. More particularly, the transversal sealing arrangement 300 may be used as the sealing apparatus 110. Although only one transversal sealing arrangement 300 is illustrated in FIG. 3A-D, the packaging machine 100 may preferably comprise two transversal sealing arrangements 300 working in pair. However, since the two transversal sealing arrangements 300 may be arranged in the same way, only one of them is illustrated in the figures.

If using two transversal sealing arrangement 300, these may be configured to alternately provide the transversal seal of the lower part of the tube 104. This principle is generally known, for instance, from the packaging machine Tetra Pak A3 Flex marketed by Tetra Pak™.

The transversal sealing arrangement 300 may comprise a first sealing jaw element 302a and a second sealing jaw element 302b. The first sealing jaw element 302a may be attached to a first arm 304a. The second sealing jaw element 302b may be attached to a second arm 304b. The first arm 304a may be attached to a first motor arrangement 306a. The second arm 304b may be attached to a second motor arrangement 306b. The first and second motor arrangement 306a, 306b may be configured to move the transversal sealing arrangement 300. The first and second motor arrangement 306a, 306b may be configured to move the first and second sealing jaw elements 302a, 302b towards each other. The first sealing jaw element 302a may comprise the inductor 206 for heating the packaging material 108. The second sealing jaw element 302b may comprise an anvil for providing a counter pressure when forming the transversal sealing. The tube 104 may further comprise a sealing band where the transversal seal may be provided. The sealing band may comprise a sealing band length 308. Preferably, the sealing band length 308 may be less than 14 mm.

Figure 3A:
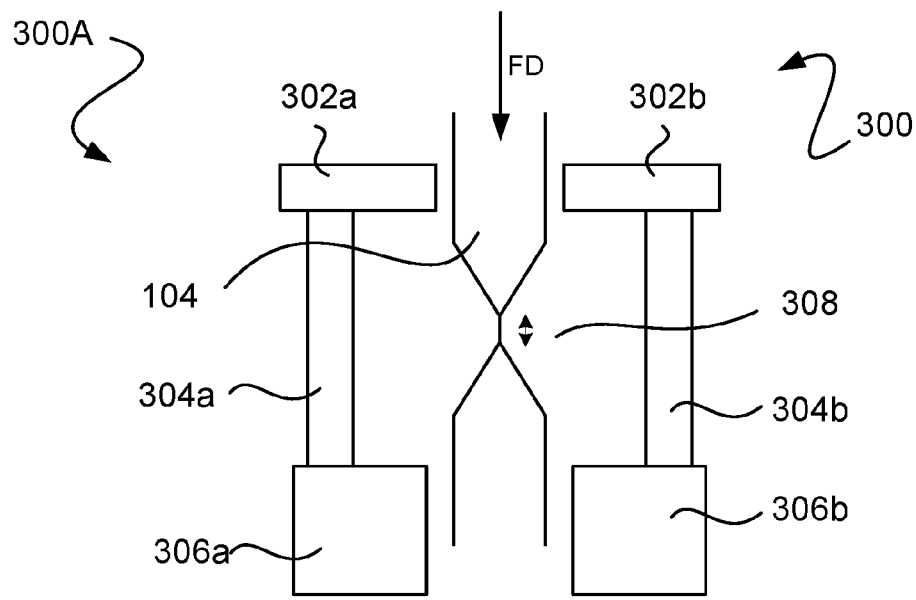
FIG. 3A-D illustrates a transversal sealing arrangement and sub-states of a sealing state.

FIG. 3A illustrates the transversal sealing arrangement 210 being in an upper, open state 300A. As illustrated, the first and second arms 304a, 304b may be in an upper position and the first and second sealing jaw elements 302a, 302b may be separated.

Figure 3B:
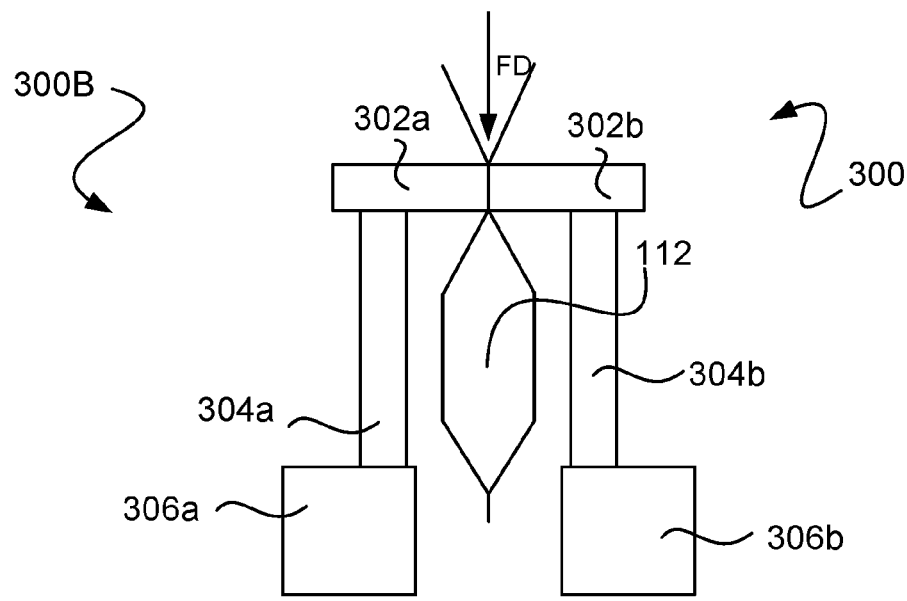

FIG. 3B illustrates the transversal sealing arrangement 210 being in an upper, sealing state 300B. As illustrated, the first and second arms 304a, 304b may be in the upper position and the first and second sealing jaw elements 302a, 302b may be pressed onto the tube 104 from opposite sides such that two opposite sides of the tube 104 are pressed towards one another. In order to provide for the transversal sealing, heat can be provided by inducing eddy currents in the packaging material while pressing the two opposite sides together. The heat provides for that a polymer layer of the packaging material is melted, which in turn provides for the polymer layer can be used for making sure that the two opposite sides can attach to each other and stay together after the jaws are removed. When the first and second sealing jaw elements 302a, 302b are pressed onto the tube 104, the food product is moved away from the sealing band, and also an inner and outer sealing section (see FIG. 5C) of the inductor. Put differently, during an upper state transition from the upper, open state 300A to the upper, sealing state 300B the product is moved away from the sealing band such that no, or at least a reduced amount of product, is encapsulated in the transversal sealing, which, as explained above, negatively affects quality of the transversal sealing.

Figure 3C:
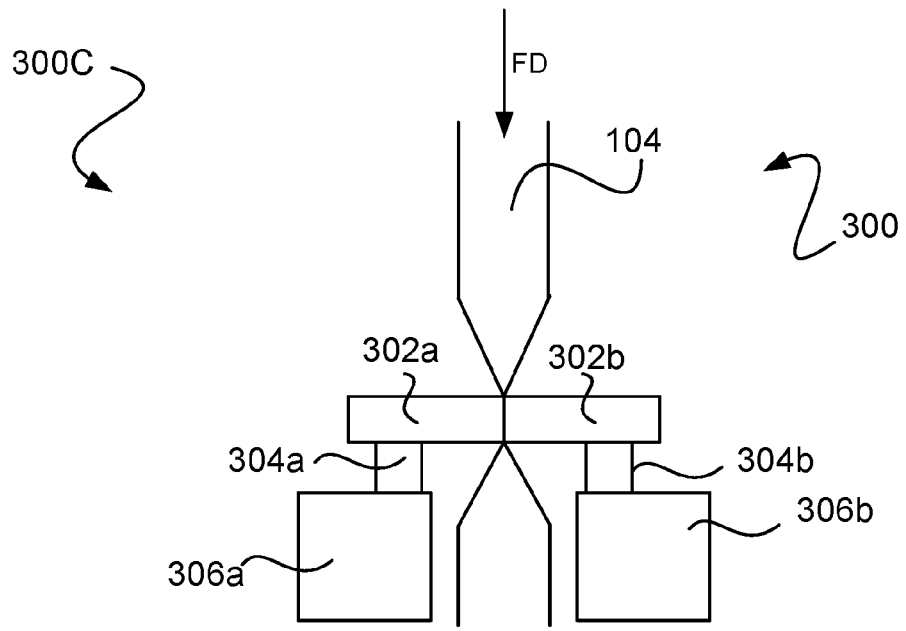

FIG. 3C illustrates the transversal sealing arrangement 210 being in a lower, sealing state 300C. As illustrated, the first and second arms 304a, 304b may be in a lower position and the first and second sealing jaw elements 302a, 302b may pressed onto the tube 104 from the opposite sides in the same way as discussed in connection with FIG. 3B.

Figure 3D:
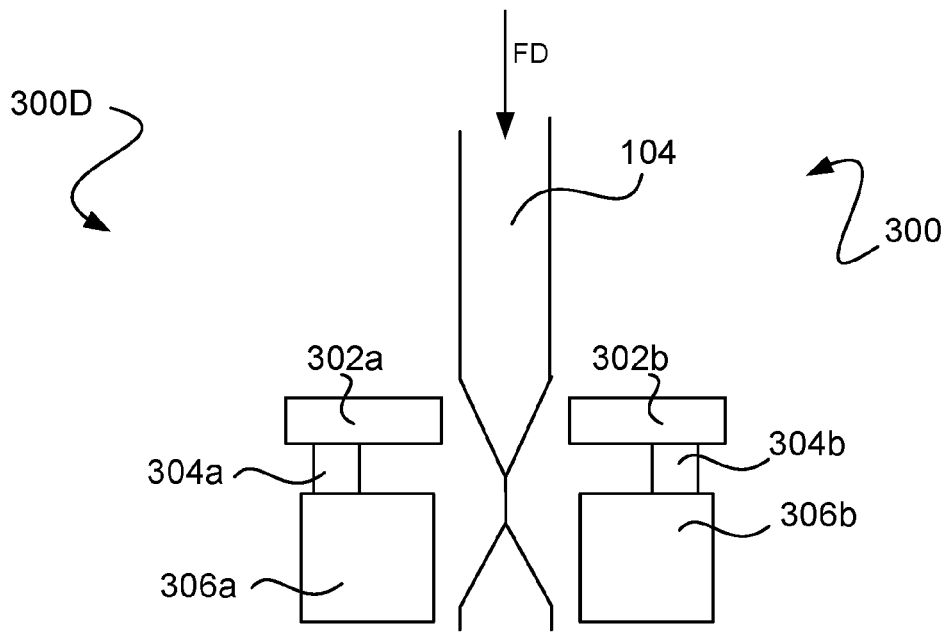

FIG. 3D illustrates the transversal sealing arrangement being in a lower, open state 300D. As illustrated, the first and second arms 304a, 304b may be in the lower position and the first and second sealing jaw elements 302a, 302b may be separated.

After having been in the states described in FIGS. 3A, 3B, 3C and 3D, the transversal sealing arrangement 300 may continue by repeating the states again.

Figure 4A:
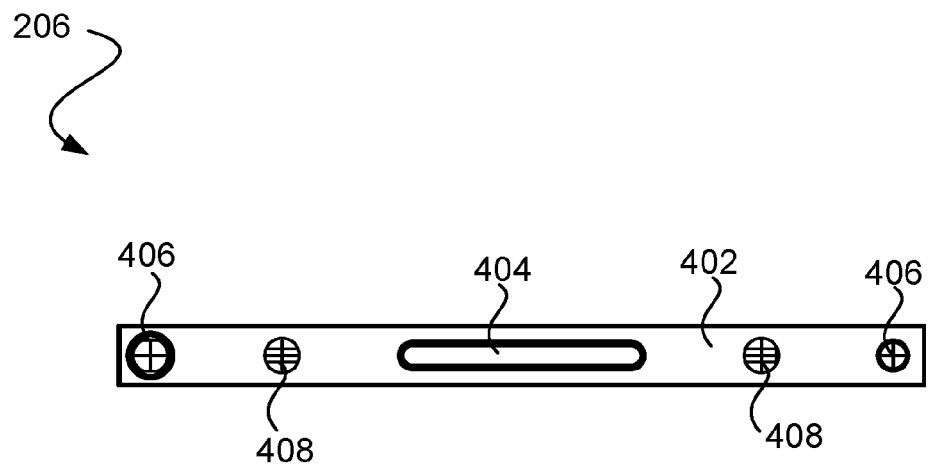
FIG. 4A-C illustrates an inductor from different points of view.
Figure 4B:
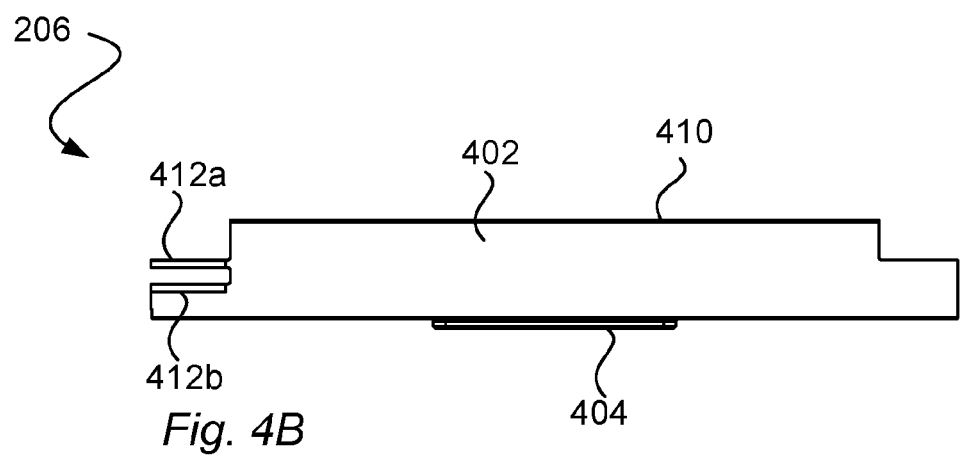
Figure 4C:
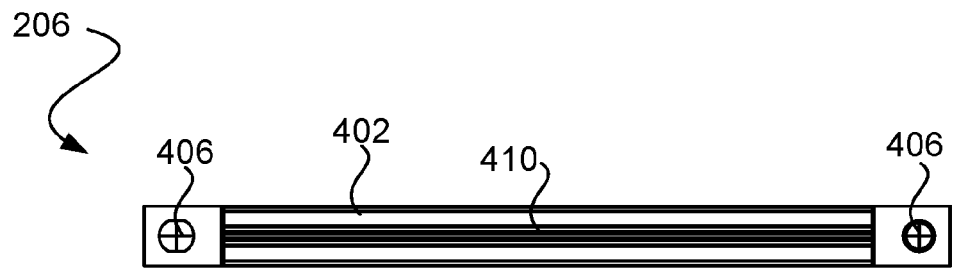

With reference to FIG. 4A-C, the inductor 206 is illustrated from different points of view by way of example. The inductor 206 is configured for transversal sealing of the tube 104 as discussed above. The inductor 206 may be mounted in the transversal sealing arrangement 300. Preferably, the inductor 206 may be mounted in the first sealing jaw element 302a as discussed in connection with FIGS. 2 and 3A-D. The technology of using an inductor for transversal sealing of packaging material is a well-known technology. However, the disclosed inductor 206 differs from conventional inductors at least in that the inductor 206 comprises a profiled surface instead of a flat surface. The purpose of the using the disclosed inductor 206 in combination with the transversal sealing arrangement 300 may be to squeeze out the product from a sealing band of the packaging material 108. Thus, this may provide for a more reliable transversal seal since no product, or at least a reduced amount of product, may be encapsulated within the sealing zone.

With reference to FIG. 4A, the inductor 206 is illustrated from below by way of example. The inductor 206 may comprise a main body 402. The main body 402 may be provided with a protrusion 404. The protrusion 404 may be configured for ensuring that the inductor 206 may be correctly mounted in the packaging machine 100. The inductor 206 may further comprise one or more holes 406 that provides for that the inductor 206 can be correctly mounted. The inductor 206 may be mounted by using bolts or screws, wherein the holes 406 may be configured to receive the bolts or screws. Thus, the protrusion 404 and the holes 406 may be configured to cooperate in order to ensure that the inductor 206 may be mounted in the correct way. In addition, the holes 406 may be configured to fix a first and a second conductor 412a, 412b which will be further discussed in connection with FIG. 4B. The inductor 206 may further comprise one or more inlets 408 for allowing cooling media to be fed into the inductor 206.

With reference to FIG. 4B, the inductor 206 is illustrated from a side perspective by way of example. In addition to what is illustrated in FIG. 4A, the inductor 206 may further comprise a profiled surface 410 which will be discussed in more detail in connection with FIG. 5A-C. The inductor 206 may further comprise an electric conductor arrangement (not illustrated in the figures). The electric conductor arrangement may be provided in the main body 402. The electric conductor arrangement may be configured for inducing eddy currents in the packaging material during the sealing state S as discussed in connection with FIGS. 2 and 3A-D. The inductor 206 may comprise the first conductor 412a and the second conductor 412b. Thus, the electric conductor arrangement may comprise a twin-loop, i.e. two electric circuits for inducing the eddy currents in the packaging material. The electric conductor arrangement may be configured for inducing the eddy currents in the packaging material via the first and second conductor 412a, 412b during the sealing state S.

With reference to FIG. 4C, the inductor 206 is illustrated from above by way of example. FIG. 4C illustrates a top view of the main body 402, the holes 406 for mounting the inductor 206 in the correct way and the profiled surface 410.

Figure 5A:
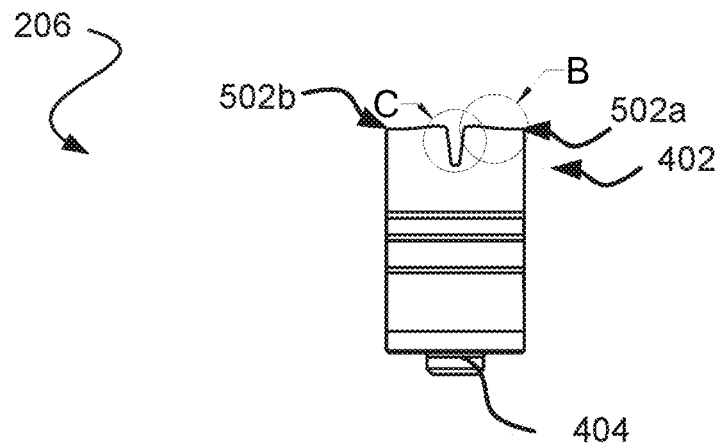
FIG. 5A-C illustrates an inductor in further detail.
Figure 5B:
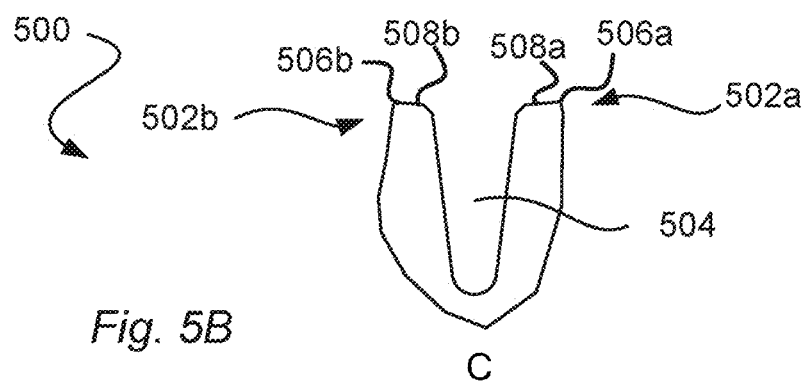
Figure 5C:
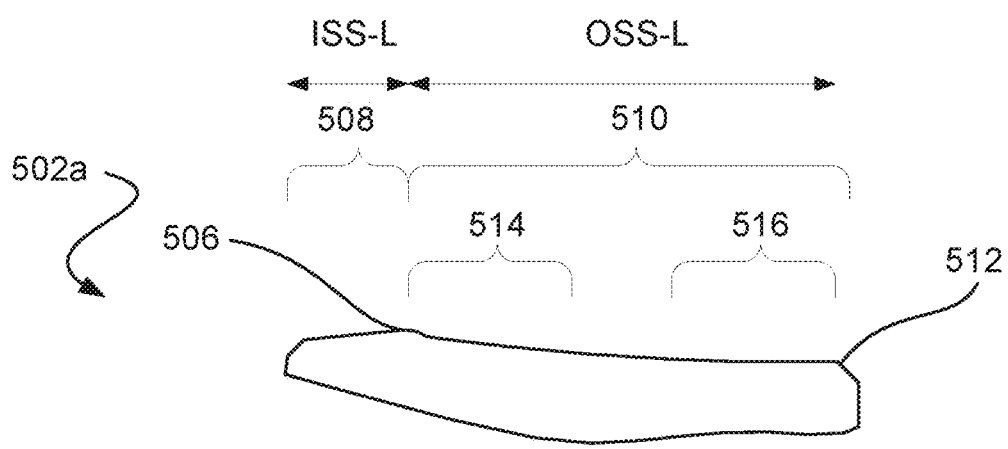

With reference to FIG. 5A-C, a cross section 500 of the inductor 206 as illustrated in FIG. 4B is illustrated by way of example. As discussed in connection with FIG. 4A-C, the inductor 206 may comprise the main body 402, the protrusion 404, the profiled surface 410 and the first and second conductor 412a, 412b.

With reference to FIG. 5A, the main body 402 may further comprise a first sealing surface 502a and a second sealing surface 502b. The first and second sealing surface 502a, 502b may be arranged to face the packaging material during the sealing state S. The inductor may further comprise a recess 504. The recess 504 may be provided in the main body 402. The recess 504 may be configured to receive the knife 208 during the cutting state C, as discussed in connection with FIG. 2. The first and second sealing surface 502a, 502b may be placed on opposite sides of the recess 504. Thus, the first and second sealing surface 502a, 502b may be symmetrical with respect to the recess 504. The first and second sealing surface 502a, 502b and the recess 504 may form the profiled surface 410 as illustrated in FIG. 4C.

With reference to FIG. 5B, the recess 504 may be illustrated in further detail by way of example. In addition, FIG. 5B may further illustrate a part 500 of the first and second sealing surface 502a, 502b. The first and second sealing surface 502a, 502b may be provided with a first and second top section 506a, 506b, respectively. The first and second top section 506a, 506b is herein further referred to as a top section 506. The first and second sealing surface 502a, 502b may be provided with a first and second inner sealing section 508a, 508b, respectively. The first and second inner sealing section 508a, 508b is herein further referred to as an inner sealing section 508. The inner sealing section 508 may be placed between the recess 504 and the top section 506, as further illustrated in FIG. 5C. The inner sealing section 508 may be inclined towards the recess 504. According to one non-limiting example, the inner sealing section 508 may have a constant inclination, but other arrangements are also possible.

With reference to FIG. 5C, the first sealing surface 502a may be illustrated in further detail by way of example. However, it should be understood that the features discussed with reference to FIG. 5C may be relevant for the second sealing surface 502*b* as well. Thus, the second sealing surface 502*b* may comprise the same features as the first sealing surface 502*a*.

In addition to what have been discussed in connection with FIG. 5B, the first sealing surface 502*a* may be provided with an outer sealing section 510. The outer sealing section 510 may be placed between the top section 506 and an outer edge 512 of the inductor 206. The outer sealing section 510 may be inclined towards the outer edge 512.

Further, the inner sealing section 508 may have an inner sealing section length, ISS-L. The outer sealing section 510 may have an outer sealing section length, OSS-L. The OSS-L may be larger than the ISS-L. Preferably, the inner sealing section length, ISS-L, may be 25% of the outer sealing section length, OSS-L.

An inner sub-section 514 of the outer sealing section 510 may comprise an inner sub-section inclination. An outer sub-section 516 of the outer sealing section 510 may comprise an outer sub-section inclination. The inner sub-section inclination may be greater than the outer sub-section inclination. The inner sub-section 514 may abut the top section 506. According to one non-limiting example, the outer sub-inclination may be parallel with the plane, thus the inclination may be 0 degrees. Upon that may be the case, the outer sub-section 516 may be parallel with the plane, thus, the outer sub-section 516 may not comprise any inclination. An advantage with having the outer sub-section parallel with the plane may be that the outer sub-section 516 may be easy to manufacture but also that distances from the inductor can easily be measured.

The disclosed design may provide for that particles in the food product held inside the tube 104 may be pushed away from a sealing band of the tube 104 as the first and second sealing surfaces 502*a*, 502*b* are pressed towards the sealing band (not illustrated). The sealing band may be a section of the tube 104 that may be formed into a transversal sealing, in a more controlled manner compared to when having flat-surfaced inductors.

Figure 6:
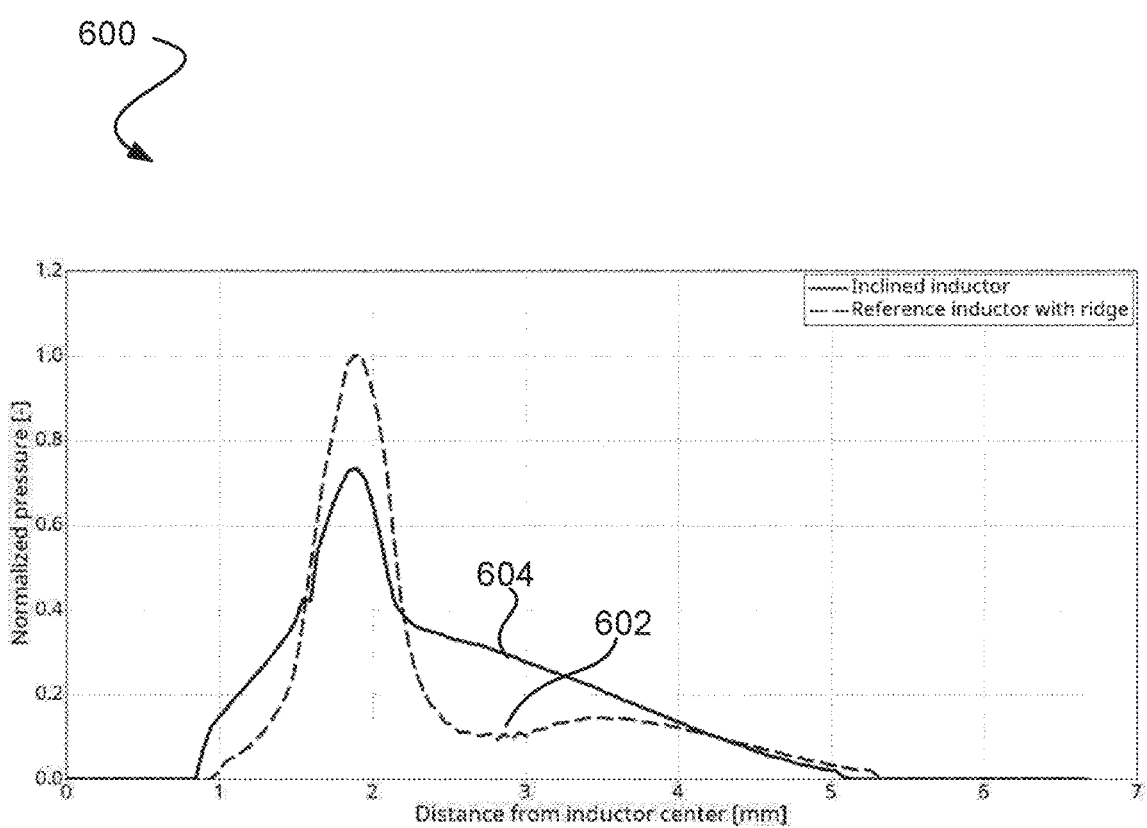
FIG. 6 illustrates a line chart comprising a plurality of pressure profiles.

With reference to FIG. 6, a line chart comprising a first and a second pressure profile is illustrated by way of example. The line chart illustrates the pressure vs. distance from an inductor center, wherein the distance is plotted in millimeter, mm.

A first line 602 may illustrate the first pressure profile, wherein the first pressure profile may be of a conventional inductor comprising a flat surface and a ridge, herein referred to as a reference inductor. As illustrated, the first line 602 may comprise a local minimum located approximately 2.6-3.6 mm from the inductor center. This local minimum may result in that product is encapsulated in the sealing zone of the tube 104 of packaging material 108.

A second line 604 may illustrate the second pressure profile, wherein the second pressure profile may linked to the disclosed inductor 206, namely an inclined inductor. As illustrated, the second line 604, does not comprise the local minimum as the first line 602 may comprise.

Thus, as illustrated in FIG. 6, when using the inductor 206 disclosed herein with the profiled surface 410 as discussed above compared to the flat surface as conventional inductors may comprise, the local minimum can be avoided. Since the local minimum may result in that food product is encapsulated within the sealing zone, this risk can be avoided by using the inductor 206 disclosed herein.

Figure 7:
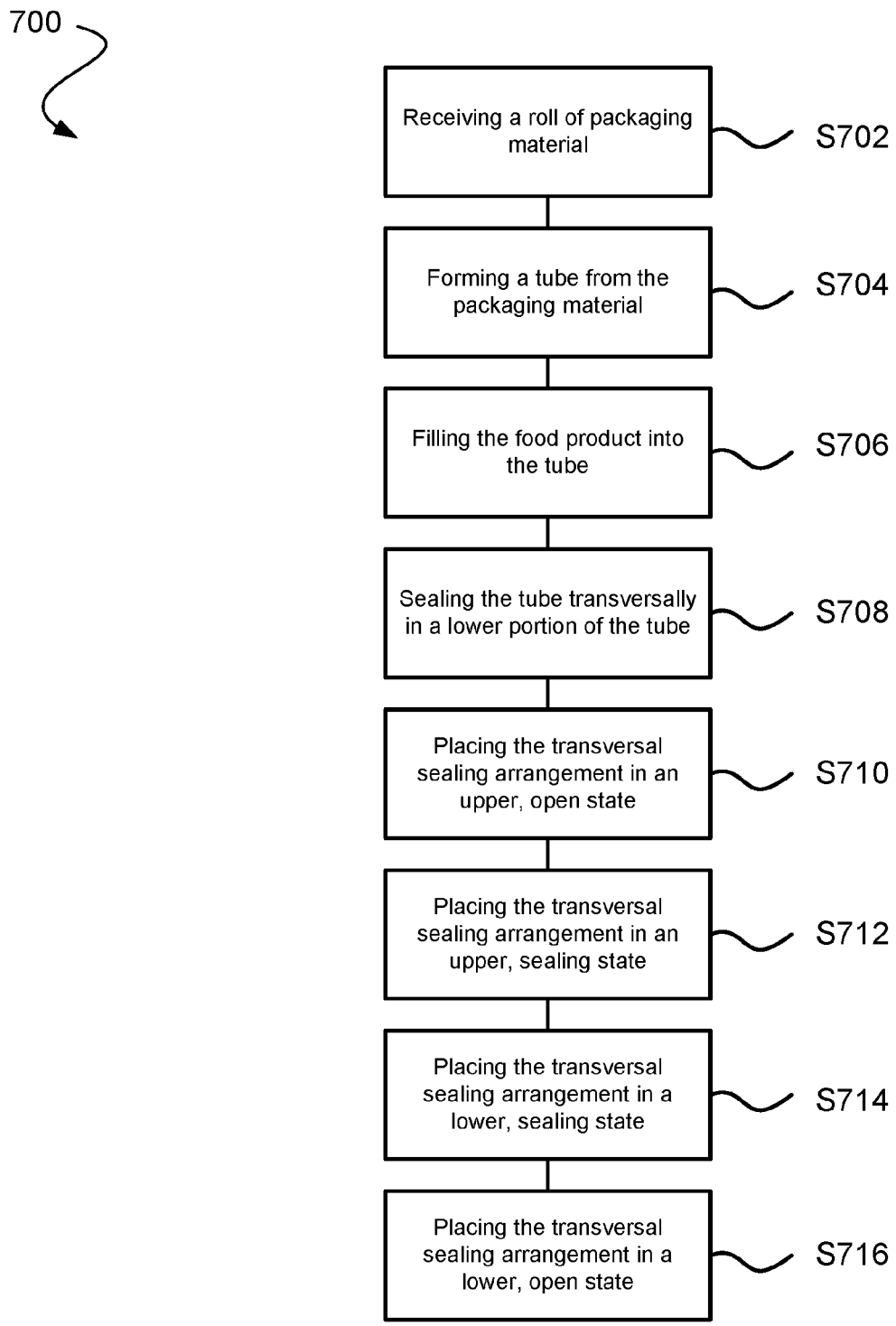
FIG. 7 is a flow chart illustrating a method for producing food package filled with food product.

With reference to FIG. 7, a flow chart illustrating a method 700 for producing food packages 108 filled with food product.

In a first step S702, a roll of packaging material 108 may be received by using a roll receiver. In a second step S704, a tube 104 may be formed from the packaging material 108 by using a tube former. In a third step S706, the food product may be filled into the tube 104 using a product filling device. In a fourth step S708, the tube 104 may be transversally sealed in a lower portion of the tube 104. The tube 104 may be sealed by using a transversal sealing arrangement according to the transversal sealing arrangement 300 discussed in connection with FIG. 6A-D.

The fourth step S708 may comprise a first sub-steps S710, wherein the first sub-step S710 may comprise placing the transversal sealing arrangement 300 in an upper, open state 300A in which the first and second arms 304*a*, 304*b* are in an upper position and the first and second sealing jaw elements 302*a*, 302*b* are separated by using the first and second motor arrangement 306*a*, 306*b*.

The fourth step S708 may comprise a second sub-step S712, wherein the second sub-step S712 may comprise placing the transversal sealing arrangement 300 in an upper, sealing state 300B in which the first and second arms 304*a*, 304*b* are in the upper position and the first and second sealing jaw elements 302*a*, 302*b* are pressed onto the tube 104 from opposite sides by using the first and second motor arrangement 306*a*, 306*b*, thereby providing for that particles in the food product held inside the tube 104 are pushed away from a sealing band of the tube 104 as the first and second sealing surfaces 502*a*, 502*b* are pressed towards the sealing band.

The fourth step S708 may comprise a third sub-step S714, wherein the third sub-step S714 may comprise placing the transversal sealing arrangement 300 in a lower, sealing state 300C in which the first and second arms 304*a*, 304*b* are in a lower position and the first and second sealing jaw elements 302*a*, 302*b* are pressed onto the tube 104 from the opposite sides by using the first and second motor arrangement 306*a*, 306*b*.

The fourth step S708 may comprise a fourth sub-step S716, wherein the fourth sub-step S716 may comprise placing the transversal sealing arrangement 300 in a lower, open state 300D in which the first and second arms 304*a*, 304*b* are in the lower position and the first and second sealing jaw elements 302*a*, 302*b* are separated by using the first and second motor arrangement 306*a*, 306*b*.

From the description above follows that, although various embodiments of the invention have been described and shown, the invention is not restricted thereto, but may also be embodied in other ways within the scope of the subject-matter defined in the following claims.

The invention claimed is:

1. An inductor for transversal sealing of a tube of packaging material filled with food product, said inductor comprising:

a main body comprising a first and a second sealing surface arranged to face the packaging material during a sealing state, a recess provided in the main body for receiving a knife during a cutting state, wherein the first and second sealing surface are on opposite sides of the recess, and an electric conductor arrangement, provided in the main body, for inducing eddy currents in the packaging material during the sealing state, each of the first and second sealing surfaces comprising a top section, an inner sealing section between the recess and the top section, and an outer sealing section between the top section and an outer edge of the inductor, and wherein the inner sealing section is continuously inclined with non-zero degrees inclination from the top section to the recess, and the outer sealing section is continuously inclined with non-zero degrees inclination from the top section to the outer edge, so that product in the food product held inside the tube is pushed away from a sealing band of the tube as the first and second sealing surfaces are pressed towards the sealing band.

2. The inductor according to claim 1, wherein an outer sealing section length is larger than an inner sealing section length.

3. The inductor according to claim 1, wherein an inner sub-section inclination of an inner sub-section of the outer sealing section is greater than an outer sub-section inclination of an outer sub-section of the outer sealing section, wherein the inner sub-section abuts the top section.

4. The inductor according to claim 1, wherein the inner sealing section has constant inclination from the top section to the recess.

5. The inductor according to claim 1, wherein a sealing band length is less than 14 mm.

6. The inductor according to claim 1, wherein the electric conductor arrangement comprises a twin-loop.

7. A packaging machine for producing food packages, said packaging machine comprising:
a roll receiver arranged to receive a roll of packaging material,
a tube former arranged to form a tube from the packaging material,
a product filling device arranged to fill the tube with food product,
a transversal sealing arrangement arranged to provide transversal sealings in a lower portion of the tube, said transversal sealing arrangement comprising a first and a second sealing jaw element, wherein the first sealing jaw element is attached to a first arm and the second sealing jaw element is attached to a second arm, wherein the first arm is attached to a first motor arrangement and the second arm is attached to a second motor arrangement, wherein the first sealing jaw element comprises an inductor according to claim 1,
wherein the second sealing jaw element comprises an anvil,
wherein the first and second motor arrangement are configured to move the transversal sealing arrangement between
an upper, open state in which the first and second arms are in an upper position and the first and second sealing jaw elements are separated,
an upper, sealing state in which the first and second arms are in the upper position and the first and second sealing jaw elements are pressed onto the tube from opposite sides,
a lower, sealing state in which the first and second arms are in a lower position and the first and second sealing jaw elements are pressed onto the tube from the opposite sides,
a lower, open state in which the first and second arms are in the lower position and the first and second sealing jaw elements are separated,
wherein the inclined inner sealing section and the inclined outer sealing section of the inductor provides for that the food product is moved away from an inner and outer sealing section of the packaging material during an upper state transition from the upper, open state to the upper, sealing state.

8. The packaging machine according to claim 7, wherein the food packages produced comprise less than 200 ml food product each.

9. The packaging machine according to claim 7, wherein the packaging machine runs with a speed of less than 20,000 food packages per hour.

10. A method for producing food packages filled with food product, said method comprising:
receiving a roll of packaging material by using a roll receiver,
forming a tube from the packaging material by using a tube former,
filling the food product into the tube using a product filling device,
sealing the tube transversally in a lower portion of the tube by using a transversal sealing arrangement comprising a first and a second sealing jaw element, wherein the first sealing jaw element is attached to a first arm and the second sealing jaw element is attached to a second arm, wherein the first arm is attached to a first motor arrangement and the second arm is attached to a second motor arrangement, wherein the first sealing jaw element comprises an inductor for heating the packaging material,
wherein the inductor comprises:
a main body comprising a first and a second sealing surface arranged to face the packaging material during a sealing state,
a recess provided in the main body for receiving a knife during a cutting state, wherein the first and second sealing surface are on opposite sides of the recess, and
an electric conductor arrangement, provided in the main body, for inducing eddy currents in the packaging material during the sealing state,
wherein each of the first and second sealing surface comprises a top section, an inner sealing section between the recess and the top section, and an outer sealing section between the top section and an outer edge of the inductor,
wherein the inner sealing section is continuously inclined with non-zero degrees inclination from the top section to the recess, and the outer sealing section is continuously inclined with non-zero degrees inclination from the top section to the outer edge, the inner sealing section being inclined over a first inclination length, the outer sealing section being inclined over a second inclination length, the first inclination length being different from the second inclination length,
wherein the second sealing jaw element comprises an anvil,
wherein the step of sealing comprises the sub-steps of
placing the transversal sealing arrangement in an upper, open state in which the first and second arms are in an upper position and the first and second sealing jaw elements are separated by using the first and second motor arrangement,
placing the transversal sealing arrangement in an upper, sealing state in which the first and second arms are in the upper position and the first and second sealing jaw elements are pressed onto the tube from opposite sides by using the first and second motor arrangement, thereby providing for that particles in the food product held inside the tube are pushed away from a sealing band of the tube as the first and second sealing surfaces are pressed towards the sealing band,
placing the transversal sealing arrangement in a lower, sealing state in which the first and second arms are in a lower position and the first and second sealing jaw elements are pressed onto the tube from the opposite sides by using the first and second motor arrangement, and placing the transversal sealing arrangement in a lower, open state in which the first and second arms are in the lower position and the first and second sealing jaw elements are separated by using the first and second motor arrangement.

11. The method according to claim 10, wherein an outer sealing section length is larger than an inner sealing section length.

12. The method according to claim 10, wherein an inner section inclination of an inner section of the outer sealing section is greater than an outer section inclination of an outer section of the outer sealing section, wherein the inner section abuts the top section.

13. The method according to claim 10, wherein the inner sealing section has constant inclination.

14. The method according to claim 10, wherein a sealing band length is less than 14 mm.

15. A food package obtainable by:

receiving a roll of packaging material by using a roll receiver, forming a tube from the packaging material by using a tube former, filling the food product into the tube using a product filling device, sealing the tube transversally in a lower portion of the tube by using a transversal sealing arrangement comprising a first and a second sealing jaw element, wherein the first sealing jaw element is attached to a first arm and the second sealing jaw element is attached to a second arm, wherein the first arm is attached to a first motor arrangement and the second arm is attached to a second motor arrangement, wherein the first sealing jaw element comprises an inductor for heating the packaging material, wherein the inductor comprises:

a main body comprising a first and a second sealing surface arranged to face the packaging material during a sealing state, a recess provided in the main body for receiving a knife during a cutting state, wherein the first and second sealing surface are on opposite sides of the recess, and an electric conductor arrangement, provided in the main body, for inducing eddy currents in the packaging material during the sealing state, wherein each of the first and second sealing surface comprises a top section, an inner sealing section between the recess and the top section, and an outer sealing section between the top section and an outer edge of the inductor, wherein the inner sealing section is continuously inclined with non-zero degrees inclination from the top section to the recess, and the outer sealing section is continuously inclined with non-zero degrees inclination from the top section to the outer edge, the inner sealing section being inclined over a first inclination length, the outer sealing section being inclined over a second inclination length, the first inclination length being different from the second inclination length, wherein the second sealing jaw element comprises an anvil, wherein the sealing of the tube comprises:

placing the transversal sealing arrangement in an upper, open state in which the first and second arms are in an upper position and the first and second sealing jaw elements are separated by using the first and second motor arrangement, placing the transversal sealing arrangement in an upper, sealing state in which the first and second arms are in the upper position and the first and second sealing jaw elements are pressed onto the tube from opposite sides by using the first and second motor arrangement, thereby providing for that particles in the food product held inside the tube are pushed away from a sealing band of the tube as the first and second sealing surfaces are pressed towards the sealing band, placing the transversal sealing arrangement in a lower, sealing state in which the first and second arms are in a lower position and the first and second sealing jaw elements are pressed onto the tube from the opposite sides by using the first and second motor arrangement, and placing the transversal sealing arrangement in a lower, open state in which the first and second arms are in the lower position and the first and second sealing jaw elements are separated by using the first and second motor arrangement.

16. The food package according to claim 15, wherein a transversal sealing fin height is 7 mm or less.

* * * * *